June 28, 1966 C. J. KORANDA 3,258,173
HOPPER DISCHARGE APPARATUS
Filed March 2, 1964 2 Sheets-Sheet 2
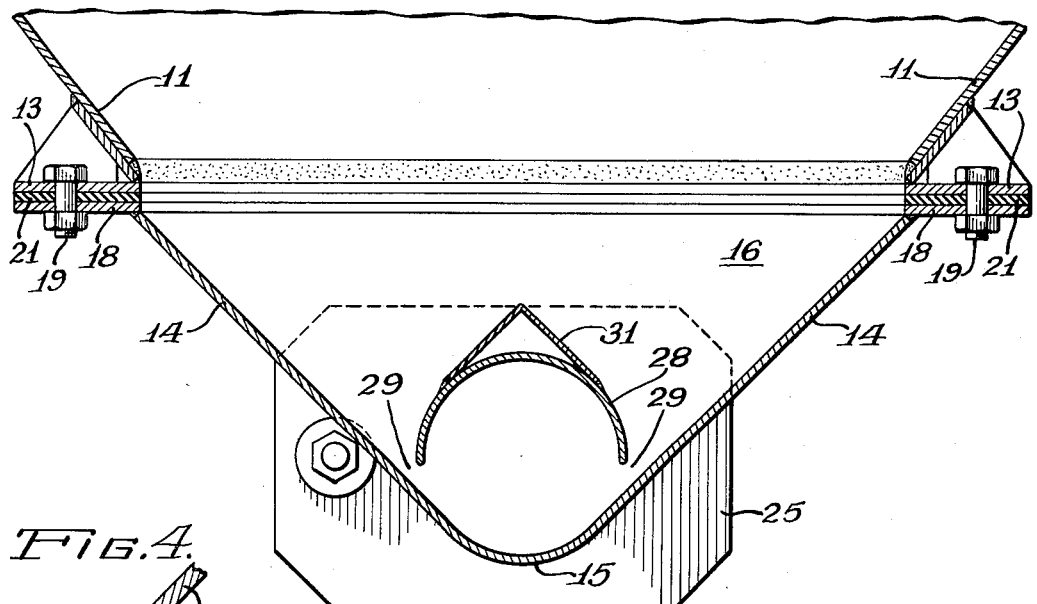
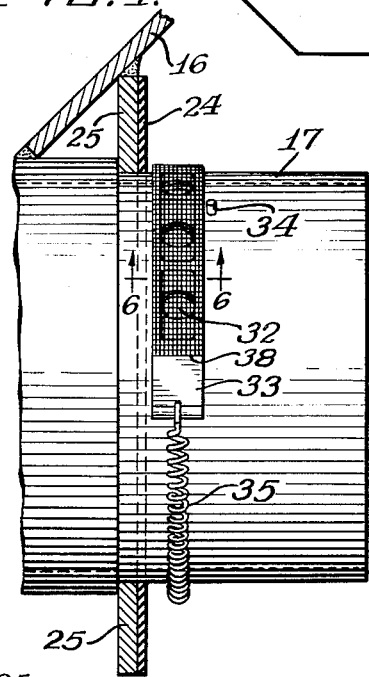
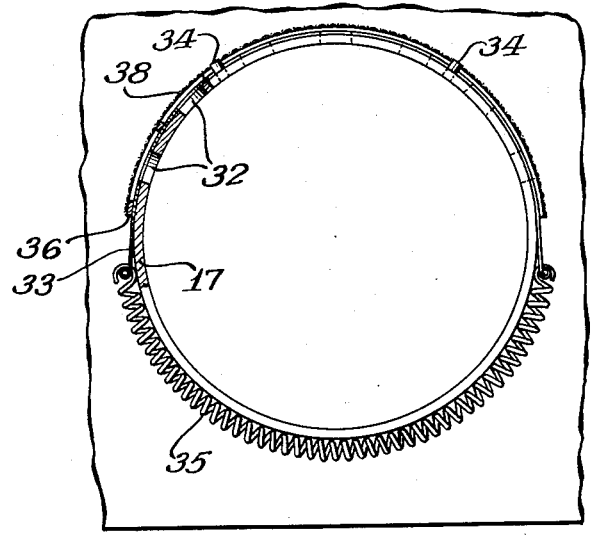
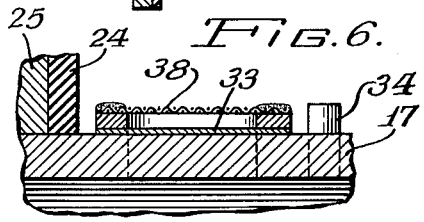
Inventor:
Clarence J. Koranda
By Baer, Freeman & McKinare
Attys.

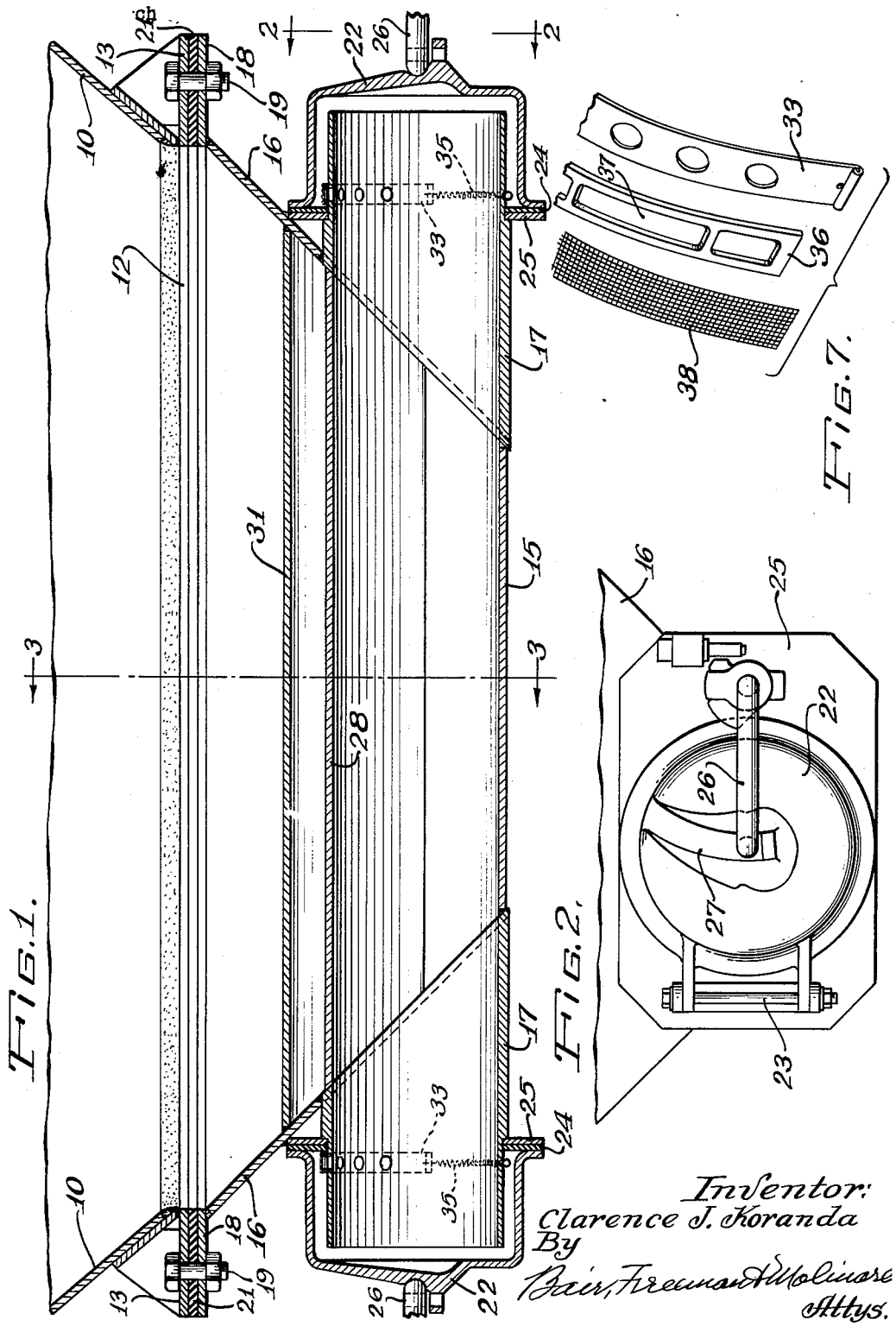

United States Patent Office 3,258,173
Patented June 28, 1966

3,258,173
HOPPER DISCHARGE APPARATUS
Clarence J. Koranda, Western Springs, Ill., assignor to North American Car Corporation, Chicago, Ill., a corporation of Illinois
Filed Mar. 2, 1964, Ser. No. 348,647
7 Claims. (Cl. 222—189)

This invention relates to hopper discharge apparatus and more particularly to a discharge structure for hoppers such as those used on railroad hopper cars for discharging the contents of the hoppers by vacuum hose connections.

It is currently common practice to discharge dry granular materials of various types such, for example, as plastic pellets from railroad hopper cars by attaching a vacuum hose to a discharge tube communicating with a discharge trough at the bottom of the hopper and drawing the material out in a stream of air. While such discharge apparatus represents a very substantial improvement over previous types of unloading apparatus, there are still several problems remaining in connection with it.

One of these problems is the construction of the discharge apparatus for complete emptying and easy cleaning of the hoppers. Hoppers as heretofore constructed have provided various pockets and projecting elements which tend to collect and hold the granular material. This is particularly true of hopper discharge apparatus having baffles adjacent to the discharge opening which tend to hold the material and which must be manually removed by a man entering the hopper to effect complete cleaning.

It is accordingly one of the objects of the present invention to provide hopper discharge apparatus in which all internal surfaces, including the baffle surfaces, are smooth, substantially continuous surfaces thereby eliminating all pockets or projecting parts in or around which material might collect.

According to a feature of the invention, the baffle is defined by an arcuate strip whose lower edges terminate in spaced relation to the inner lower surface of the discharge trough to define two flow openings whose total area is less than the area of the discharge tube. This construction insures smooth continuous flow of material from the hopper during unloading. The baffle preferably forms a continuation of the upper portion of the discharge conduit and is preferably covered by an inverted V-shaped strip to eliminate any horizontal surface which might collect and retain material.

Another problem is accurate regulation of the rate of flow of material from the hopper. This becomes extremely important where the material is taken directly to processing equipment as is frequently the case with plastic pellets. With some materials having strong bridging or packing tendencies, too high a vacuum may cause the material to pack so that it will feed erratically in chunks or slugs, if at all. On the other hand, with other materials which flow relatively freely it may be desirable to employ the maximum available vacuum. Use of mechanical valves to control flow of the material is not satisfactory particularly in the case of materials having strong packing tendencies.

It is therefore a further object of the invention to provide hopper discharge apparatus in which the degree of vacuum to which the material is exposed may be easily and accurately regulated by variably bleeding air into the discharge tube outside of but adjacent to the hopper.

According to a feature of the invention, the discharge tube is formed with vent openings, preferably spaced circumferentially over its upper portion and which may be variably covered by a circumferentially adjustable control strip. The control strip preferably is formed of thin metal, or the like, fitting over the discharge tube and having openings therein registering with the openings in the discharge tube and which is provided with resilient means, such as a spring, to hold it on the discharge tube for circumferential sliding movement thereon.

According to another feature of the invention, the control strip is covered by a skeletal frame having openings therein larger than and registering with the openings in the strip and which supports a screen in spaced relationship to the strip to prevent entry of foreign particles into the discharge tube while providing minimum restriction to the flow of air.

The above and other objects and features of the invention will be more readily apparent from the following description when read in connection with the accompanying drawings, in which:

FIG. 1 is a transverse section through a portion of a hopper equipped with discharge apparatus embodying the invention;

FIG. 2 is a partial end view on the line 2—2 of FIG. 1;

FIG. 3 is a partial section on the line 3—3 of FIG. 1;

FIG. 4 is a partial enlarged elevation of the discharge tube and vacuum control mechanism;

FIG. 5 is an end view looking from the right in FIG. 4;

FIG. 6 is a partial section on the line 6—6 of FIG. 4; and

FIG. 7 is a partial exploded perspective view of the control strip.

The apparatus of the present invention is illustrated in FIGS. 1 and 3 as being applied to a conventional hopper structure such, for example, as a railroad car hopper, as more particularly described in my co-pending application Serial No. 192,710, filed May 7, 1962, now Patent No. 3,167,222, dated January 26, 1965. The hopper, as shown, is formed with lower side and end walls 10 and 11 which taper downwardly and inwardly to define a generally rectangular discharge opening, indicated at 12. A flange 13 is secured to the lower edge of the hopper and projects outwardly therefrom for securing the discharge apparatus to the hopper.

The discharge apparatus comprises a trough having side walls 14 tapering inwardly at the same angle as the hopper end walls 11 and forming in effect a substantial continuation thereof. At the bottom the side walls are joined by an arcuate bottom section 15. The hopper is completed by inwardly angling end walls 16 which are at substantially the same angle as the hopper side walls 10 and which form in effect a continuation of the hopper side walls. The end walls 16 are formed with opening therethrough to which discharge conduits 17 are connected. As best seen in FIG. 1, the discharge conduits 17 are short cylindrical sections which are secured to the end walls of the hopper as, for example, by welding and whose lower portions form smooth continuations of the arcuate trough bottom 15.

The trough is mounted at the lower end of the hopper over the discharge opening therein by means of a flange 18 thereon which registers with the flange 13 and which may be secured thereto by a series of spaced fastenings such as the bolts 19. Preferably a sealing strip 21 is mounted between the flanges to provide an air tight joint therebetween. The flanges may be welded smoothly to the hopper and trough respectively, as shown, so that they will provide no edges or pockets which could catch and retain material. In the construction shown, the flanges and sealing strip provide a vertical offset between the hopper walls and the trough walls, but no material can collect or be held on this account.

The discharge conduits 17 are preferably normally closed by covers 22 which are constructed and operated as more particularly disclosed and claimed in my application Serial No. 192,710, now Patent No. 3,167,222. As shown in FIGS. 1 and 2, each cover 22 is cupped to fit over the projecting end of the adjacent discharge conduit and is hinged at one side, as shown at 23, for swinging in a horizontal plane toward and away from its closed position. In its closed position, the rim of each cover seats against a sealing strip 24 supported on a flange 25 on the discharge conduit and is held against the sealing strip by an arm 26 pivoted at the opposite side of the cover. The free end of the arm moves over a cam surface 27 on the cover to press the cover securely against the sealing strip to close the circuit.

In the discharge structure, as shown, the trough is provided with a baffle 28 which is of partial cylindrical configuration and which is secured in the trough with its lower edges spaced from the adjacent lower portions of the trough to define a pair of discharge openings 29. The baffle 28 is smoothly welded to the inner surface of the trough, as seen in FIG. 1, so that there will be no sharp projections or corners to catch and retain material. A V-shaped baffle 31 is secured above the tube section baffle 28, as best seen in FIG. 3, with its sides sloping downward at a sufficient angle so that granular material will not be held on them thereby to prevent material from collecting on the upper surface of the tubular baffle 28. As seen in FIG. 1, the tubular baffle 28 forms a smooth continuation of the upper portion of the discharge conduits 17.

With this construction, as so far described, granular material in the hopper can flow freely and smoothly around the baffle into the trough through the openings 29 and can be drawn from one or the other of the discharge conduits which is connected to a source of vacuum in the usual manner. According to a feature of the invention the total area of the two openings 29 is less than the cross sectional area of the discharge conduit thereby insuring a smooth even flow of material from the hopper through the discharge conduit.

According to a further feature of the present invention, air may be selectively vented into the discharge conduits adjacent to but outside of the trough to regulate the degree of vacuum which can be maintained on the material being discharged. For this purpose, as best seen in FIGS. 4 and 5, each of the discharge conduits is formed with a series of circular openings 32 spaced circumferentially over its upper portion closely adjacent to the flanges 25. A flexible strap 33 of sheet metal or the like overlies the discharge conduit and the openings therein and is itself formed with a series of openings spaced to register with the openings 32. The strap may be held in axial position in registration with the openings by one or more guide pins 34 on the conduit 17. The strap 33 is held in place on the discharge conduit for circumferential movement thereon by a spring, such as the coil spring 35 as shown.

In order to prevent foreign material from entering the discharge conduit without interfering with free flow of air through the openings the control strip 33 is covered by a skeletal frame structure 36 as best seen in FIG. 7. This frame structure is preferably of the same width as the control strip, but is formed with a series of large openings 37 extending therethrough which will provide a total flow area substantially in excess of the total flow area of the openings 32. A screen 38 is secured over the frame 36 and is held by the frame in spaced relation to the control strip 33. Preferably the screen is soldered at its edges to the frame although any other desired fastening means may be employed.

With this construction the control strips can be turned easily around the discharge conduits to open the openings 32 to a greater or lesser extent thereby to regulate the amount of air bled into the conduit. The screen 38 will prevent any foreign material from entering the discharge conduit and contaminating the material being discharged, but because of the fact that it provides a substantially greater area than the openings 32 it will not in any way restrict flow of air into the discharge conduit.

The present invention thus provides a relatively simple hopper discharge structure which will effect smooth and continuous discharge of material from a hopper, such as a railroad car hopper. It further provides accurate regulation of the degree of vacuum to which the material can be subjected by variably regulating bleed of air into the discharge conduit.

While one embodiment of the invention has been shown and described in detail, it will be understood that this is illustrative only and is not to be taken as a definition of the scope of the invention, reference being had for this purpose to the appended claims.

What is claimed is:

1. Hopper discharge apparatus in combination with a hopper having walls converging downwardly and terminating in a rectangular discharge opening, said apparatus comprising a trough member secured to the hopper under the opening having downwardly tapering sides forming smooth continuations of the opposite sides of the hopper and merging into an elongated bottom of arcuate section, a circular discharge tube opening into one end of the trough member with its bottom portion forming a continuation of the arcuate bottom of the trough, a baffle fixed in the trough member having arcuate side portions forming continuations of the side portions of the discharge tube and an inverted V-section top, the lower edges of the baffle terminating in spaced relation to the trough member to leave elongated feed openings whose total area is less than the cross sectional area of the discharge tube, said discharge tube being adapted for connection to a source of vacuum whereby material in the hopper can be sucked therefrom through the feed openings and discharge tube.

2. Hopper discharge apparatus in combination with a hopper having walls converging downwardly and terminating in a rectangular discharge opening, said apparatus comprising a trough member secured to the hopper under the opening having downwardly tapering sides forming smooth continuations of the opposite sides of the hopper and merging into an elongated bottom of arcuate section, a circular discharge tube opening into one end of the trough member with its bottom portion forming a continuation of the arcuate bottom of the trough, an elongated baffle of parti-circular section mounted in the trough member above and parallel to the trough bottom and forming a partial continuation of the discharge tube, the lower edges of the baffle being spaced from the trough member to define feed openings whose total area is less than the cross-sectional area of the discharge tube, the baffle being of uniform section throughout the full length of the trough member and being secured at its ends to the end walls of the trough member, said discharge tube being adapted for connection to a source of vacuum whereby material in the hopper can be sucked therefrom through the feed openings and discharge tube.

3. The hopper discharge apparatus of claim 2 in which the baffle extends through more than half of a circle so that its lower edges lie in a horizontal plane below the axis of the discharge tube.

4. The hopper discharge apparatus of claim 2 in which the discharge tube is provided with at least one vent opening spaced from its end and outside of but adjacent to the trough member and means are provided to control the effective size of the vent opening.

5. The hopper discharge apparatus of claim 2 in which the discharge tube is formed in its upper portion adjacent to the trough member with a series of circumferentially spaced vent openings, and an arcuate strip formed with similarly spaced openings is slidable over the discharge tube to move the openings therein into and out of registry with the openings in the discharge tube thereby to vary the effective size of the openings in the discharge tube.

6. Hopper discharge apparatus comprising a generally rectangular trough having an elongated bottom of arcuate section and upwardly flaring side walls merging smoothly into the bottom, a circular discharge tube opening into one end of the trough with its bottom portion forming a continuation of the trough bottom, the discharge tube being formed adjacent to but outside of the trough with a series of spaced vent openings in the discharge tube outside of but adjacent to the trough, a relatively thin control strip fitting slidably over the discharge tube and formed with a series of openings to be moved into and out of registration with the vent openings, a skeletal frame fitting over the control strip and formed with openings therethrough registering with and substantially larger than the openings in the control strip, and a screen secured over the frame and held thereby in spaced relation to the control strip.

7. Hopper discharge apparatus comprising a generally rectangular trough having an elongated bottom of arcuate section and upwardly flaring side walls merging smoothly into the bottom, a circular discharge tube opening into one end of the trough with its bottom portion forming a continuation of the trough bottom, the discharge tube being formed adjacent to but outside of the trough with a series of spaced vent openings in the discharge tube outside of but adjacent to the trough, a relatively thin control strip fitting slidably over the discharge tube and formed with a series of openings to be moved into and out of registration with the vent openings, a skeletal frame fitting over the control strip and formed with openings therethrough registering with and substantially larger than the openings in the control strip, a screen secured over the frame and held thereby in spaced relation to the control strip, a baffle of arcuate section extending through slightly more than a half circle in the trough above and parallel to the bottom thereof with its open side down and its lower edges spaced from the trough bottom to define feed openings whose total area is less than the cross sectional area of the discharge tube, and an inverted V-section strip fitting over the baffle, the strip and baffle fitting smoothly against the ends of the trough.

References Cited by the Examiner
UNITED STATES PATENTS

| | | | |
|---|---|---|---|
| 828,504 | 8/1906 | Rapp | 222—171 |
| 2,753,220 | 7/1956 | Kemper | 302—52 |
| 2,941,842 | 6/1960 | Wishaw | 302—52 |
| 3,020,092 | 2/1962 | Dorey | 302—52 |
| 3,048,449 | 8/1962 | Aller | 302—52 |
| 3,088,776 | 5/1963 | Aller | 302—52 |
| 3,153,494 | 10/1964 | Heider | 222—328 X |
| 3,162,490 | 12/1964 | Koranda et al. | 302—52 |
| 3,167,222 | 1/1965 | Koranda | 222—512 |

RAPHAEL M. LUPO, *Primary Examiner.*